United States Patent [19]
Van Horn et al.

[11] 4,083,421
[45] Apr. 11, 1978

[54] TWO SPEED MOTORCYCLE HUB TRANSMISSION

[76] Inventors: Ronald L. Van Horn, 44 Poinsettia Ave.; Donald R. Van Horn, 18 Bay View, both of Pittsburg, Calif. 94565; Roy B. Van Horn, 238 Jefferson St., Monte Vista, Colo. 81144

[21] Appl. No.: 747,622

[22] Filed: Dec. 6, 1976

[51] Int. Cl.² ............................................ B62M 11/16
[52] U.S. Cl. .................................. 180/88; 74/750 R; 180/33 B
[58] Field of Search .................... 180/88, 33 R, 33 B, 180/75; 74/750 R, 750 B, 785; 192/6 A

[56] References Cited
U.S. PATENT DOCUMENTS

| | | | |
|---|---|---|---|
| 832,442 | 10/1906 | Archer | 74/750 B |
| 854,599 | 5/1907 | Pedersen | 74/750 B |
| 1,128,684 | 2/1915 | Johanson | 74/750 R |
| 1,308,602 | 7/1919 | Mennesson | 180/33 E |
| 2,066,952 | 1/1937 | Tornebohm | 74/785 X |
| 2,494,558 | 1/1950 | Irwin | 74/750 B |
| 3,686,978 | 8/1972 | Knoblach | 74/750 R |

*Primary Examiner*—Kenneth H. Betts
*Attorney, Agent, or Firm*—Blair & Brown

[57] ABSTRACT

A two speed motorcycle hub transmission in which the wheel may be driven at a one to one, or at a lower speed by a sliding clutch changing the drive from having the wheel locked to the drive shaft, to a planetary system the drive shaft driving the sun gear.

5 Claims, 4 Drawing Figures

TWO SPEED MOTORCYCLE HUB TRANSMISSION

BACKGROUND OF THE INVENTION

It is an object of the present invention to provide a two speed hub for a motorcycle so that the motorcycle may be operated at either a one to one speed or at a lower speed by a very simple hub that makes the motorcycle convertible from a motorcycle of one gear ratio to one of another.

Other and further objects and advantages will appear from the following specification taken with the accompanying drawings in which like reference characters refer to similar parts in the several views.

DESCRIPTION OF THE PREFERRED EMBODIMENT

Figure 1:
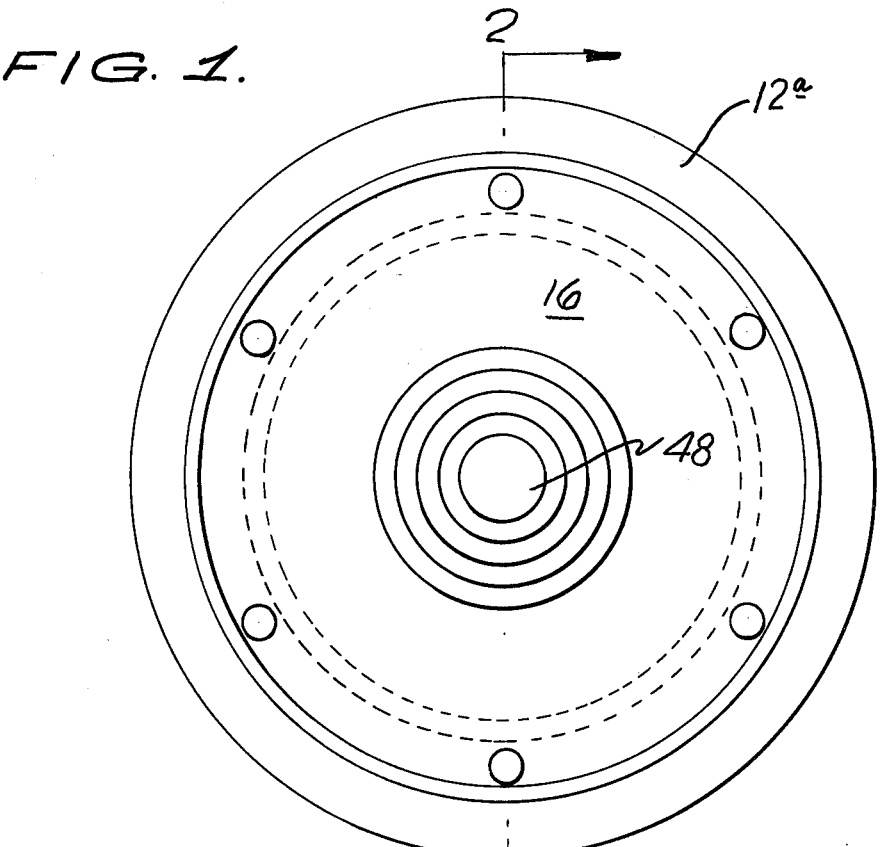
FIG. 1 is an elevation of the device looking from the right in FIG. 2.
Figure 3:
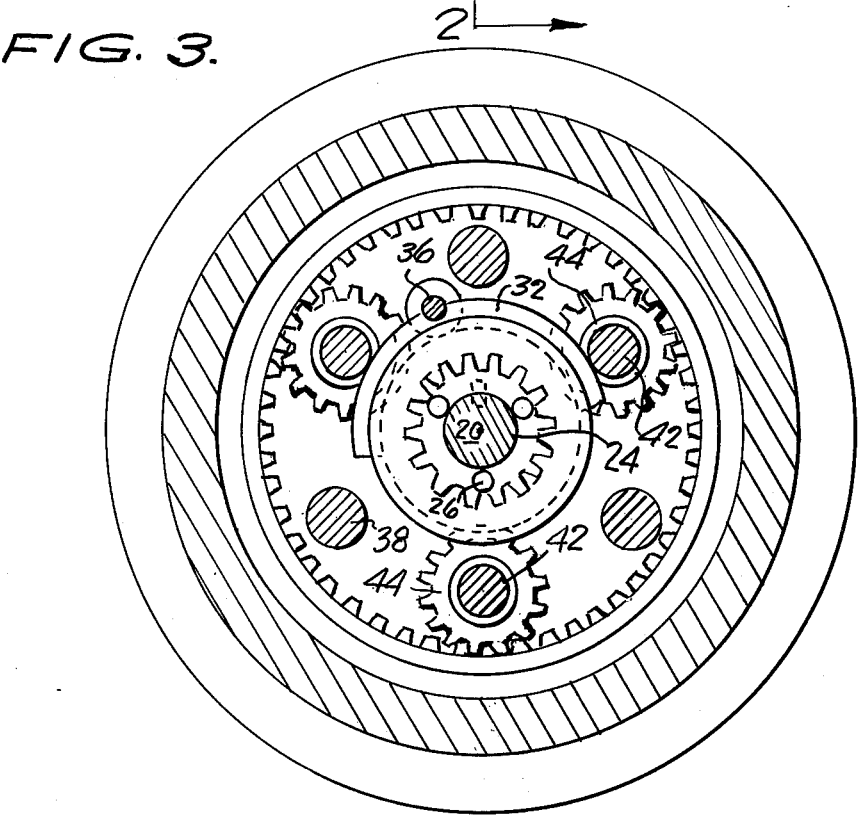
FIG. 3 is a section taken on line 3—3 of FIG. 2.

The hub comprises a cylindrical casing 10 having one open side and peripheral flanges 12 and 12a to which the spokes of the wheel are to be secured, and a cylindrical bearing receiving flange 14. The open side of the casing is closed by a plate 16 bolted to casing 10 provided with a cylindrical bearing receiving flange 18.

A shaft 20 which is driven by the motorcycle motor extends into casing 10 through a bearing enclosed in flange 14. A gear 22 is keyed to shaft 20. This gear 22 is the means by which the power from the motorcycle engine is transmitted to the wheel by the hub.

A second gear 24 of the same diameter and number of teeth as gear 22 is mounted for free rotation on shaft 20 but is pinned by pins 26 to a plate 28 that is bolted to casing 10.

An internal gear 30 slidably engages over gear 22 and while still engaging gear 22, may be slid over gear 24 so that gear 24, pinned to casing 10 will drive casing 10 at a one to one ratio.

Internal gear 30 may also be moved axially, when desired, by half ring 32, riding in an annular groove 34 in internal gear 24.

Figure 2:
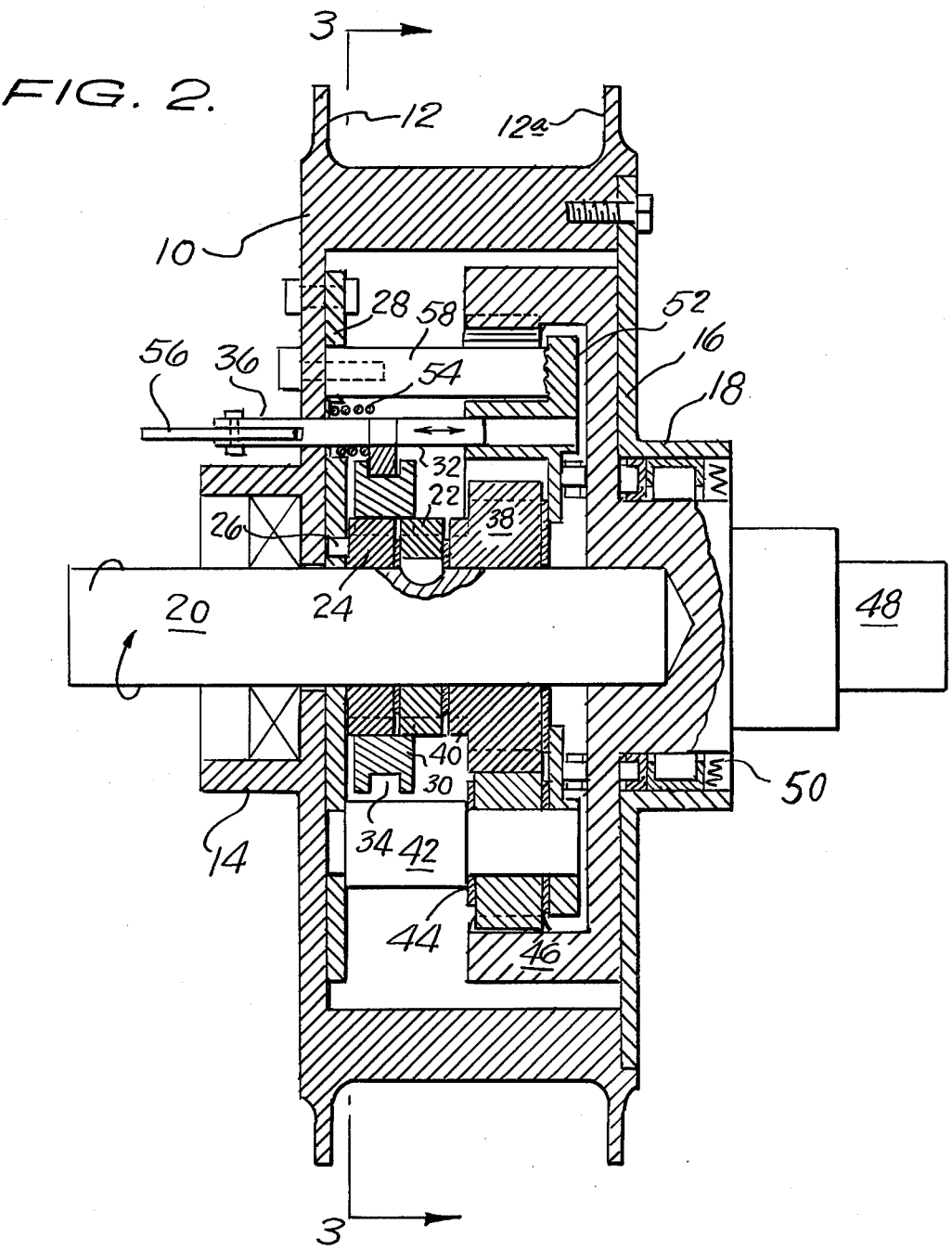
FIG. 2 is a section taken on line 2—2 of FIG. 1.
Figure 4:
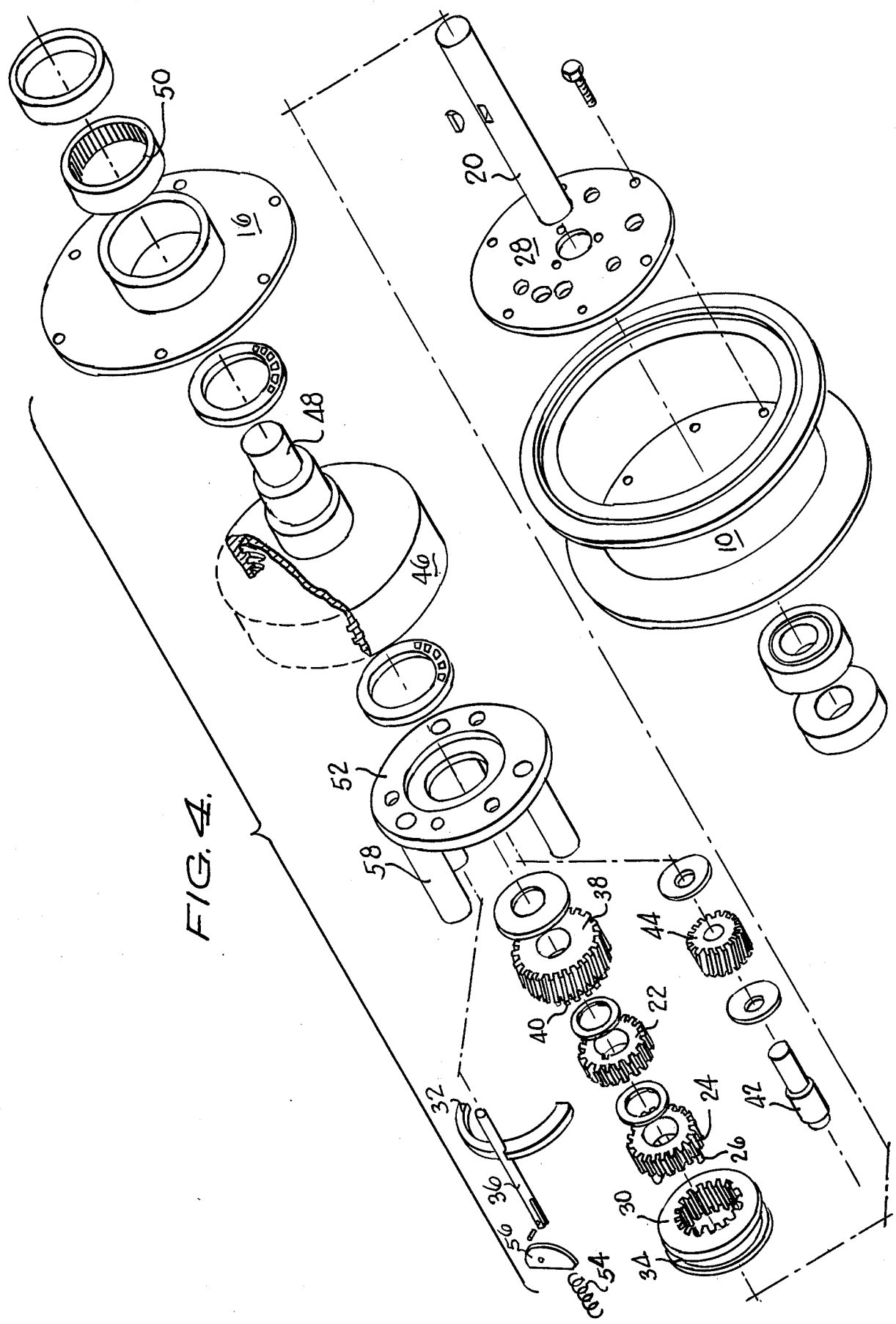
FIG. 4 is an exploded view of the device.

Half ring 32 is mounted on an axially moveable shaft 36 extending parallel to shaft 20 so that when shaft 36 is moved axially, internal gear 30 is moved axially so as to either engage over gear 24 to the left as seen in FIG. 2 while still engaging gear 22, or to the right to disengage from gear 24, and to engage sun gear 38 which is mounted for free rotation on shaft 20. Sun gear 38 has a shoulder 40 in the form of a gear similar to gears 22 and 24 as to diameter and number of teeth so that when internal gear 30 is moved to the right in FIG. 2 under the influence of half ring 32 gear 22, keyed to shaft 20 will drive sun gear 38 at a one to one ratio.

Secured to plate 28 and casing 10 is at least one stud 42 (but preferably three) on which a planet gear 44 is mounted for free rotation on the stud and in mesh with sun gear 38.

An internal ring gear 46 meshes with planet gear 44. Internal gear 46 is held against rotation by an extension 48 extending through plate 16 to be mounted on the frame of the motorcycle. A bearing 50 is included between flange 18 on plate 16 and element 48 so plate 16 and casing 10 may rotate easily.

It will be noted that internal gear 30 is wide enough so that when moved to the left to fully engage gear 24 it will remain in mesh with gear 22, and when moved to the right to fully engage the gear teeth of shoulder 40 it will remain in mesh with gear 22.

Studs 42 are supported at their ends remote from plate 28 by a plate 52 providing also a support for axially moveable shaft 36 that moves half ring 32 that positions internal gear 30 so that it can engage either gears 22 and 24, or gears 22 and 40. Axially moveable shaft 36, carrying half ring 32 is biased to the right in FIG. 2 by spring 54. A cam lever 56 is shown in FIG. 2 holding half ring 32, and therefore internal gear 30, in mesh with gears 24 and 22 to give the one to one drive. If cam lever 56 is turned to permit shaft 36 to move to the right, internal gear 30 will be biased to move to the right so that it engages the gear teeth of shoulder 40 as well as gear 22.

Gear 22, now driving sun gear 38, will rotate sun gear 38 in the same direction as shaft 20 is rotating. Sun gear 38 will rotate planet gears 44 which will roll on the stationary internal ring gear so that studs 42 will move, within internal ring gear 46, in the same rotational direction as shaft 20, but at a reduced speed. Since studs 42 are secured to casing 10 the entire hub will be rotated at the reduced speed. The actual speed ratio will depend on the diameter of sun gear 38 and planet gears 44.

Struts 58 securing plate 52 in position absorb the torque that might otherwise interfere with the alignment of planet gears 44.

Use of elements 58 along with plates 28 and 52 to form a "spider" to carry planet gears 44 makes it possible to assemble shaft 20, gears 22, 24, 30, 38 and 44 along with half ring 32 and its actuating springed shaft 54 and 36, into a unit to facilitate manufacture of its hub.

Having thus described the preferred embodiment of the invention it should be understood that numerous structural modifications and adaptations may be resorted to without departing from the spirit of the invention.

What is claimed is:

1. A two speed hub for a vehicle including a hub casing, a first shaft, extending into said same hub casing from one side by which said hub may be rotated, a driving element keyed to said first shaft, a first driven element rotatably mounted on said first shaft secured to said hub casing on one side of said driving element, a second driven element rotatably mounted on said first shaft positioned on the other side of said driving element said second driven element being fixed to a sun gear of a planetary gear system, a second shaft to be fixed to the vehicle extending coaxially into said casing, an internal ring gear within said hub casing fixed to said second shaft, a spider secured to said casing, at least one planet gear carried by said spider meshing with said sun gear and with said internal ring gear, and axially moveable means to selectively couple said driving element to said first or second driven elements.

2. The two speed hub of claim 1 which said driving elements and said first and second driven elements are spur gears having the same diameters and the same number of teeth, and said axially moveable means comprising an internally toothed element complimentary to said spur gears.

3. The two speed hub of claim 2 in which said axially moveable means is provided with an annular groove, a half ring slidably engages said ring, and a shaft is secured to said half ring slidable in direction normal to the plane of said half ring is provided extending through said casing whereby said axially moveable means may be moved to selectively couple said driving element to said driven elements.

4. The two speed hub of claim 3 in which said shaft secured to said half ring is spring biased to press said axially moveable means into engagement with said second driven element, and cam means to pull said shaft to move said axially moveable means against said spring bias into engagement with said first driven element.

5. The two speed hub of claim 2 in which the axial dimension of said axially moveable means is sufficiently great that when it is in a position to fully engage one of said driven elements, it will also engage said driving element.

* * * * *